(12) United States Patent
Hamilton

(10) Patent No.: US 7,287,793 B2
(45) Date of Patent: Oct. 30, 2007

(54) DETACHABLE CLEARANCE WANDS

(75) Inventor: David Hamilton, San Diego, CA (US)

(73) Assignee: DC2 Enterprises, LLC, San Diego, CA (US)

( * ) Notice: Subject to any disclaimer, the term of this patent is extended or adjusted under 35 U.S.C. 154(b) by 0 days.

(21) Appl. No.: 11/392,510

(22) Filed: Mar. 28, 2006

(65) Prior Publication Data

US 2007/0006791 A1   Jan. 11, 2007

Related U.S. Application Data

(63) Continuation-in-part of application No. 11/176,114, filed on Jul. 6, 2005.

(51) Int. Cl.
*B60J 9/00* (2006.01)

(52) U.S. Cl. .................... 296/1.04; 116/28 A

(58) Field of Classification Search ............... 296/1.04; 116/28 A
See application file for complete search history.

(56) References Cited

U.S. PATENT DOCUMENTS

| | | | | |
|---|---|---|---|---|
| 2,753,439 A | * | 7/1956 | Greenfield | ............... 362/549 |
| 3,342,489 A | * | 9/1967 | Waldo | ............... 473/47 |
| 6,213,047 B1 | | 4/2001 | Means et al. | ............... 116/28 R |
| 6,325,437 B2 | * | 12/2001 | Hiebert et al. | ............... 296/26.01 |
| 6,644,235 B2 | | 11/2003 | Haynes | ............... 116/28 R |
| 2004/0254035 A1 | * | 12/2004 | Hoffman | ............... 473/423 |
| 2006/0011793 A1 | * | 1/2006 | Dupuis et al. | ............... 248/205.5 |

\* cited by examiner

*Primary Examiner*—Lori L. Lyjak
(74) *Attorney, Agent, or Firm*—Steins & Associates, P.C.

(57) ABSTRACT

Detachable Clearance Wands are disclosed. The wands provide a driver of a large vehicle having slideout compartments with a clear dimension for the extension length of the slideout. The wands are attachable to the vehicle's side prior to parking it to provide the extension length without risk of damage to the slideout. The wands are length-adjustable so that they can be configured for any length slideout. In an alternate embodiment, the wands are comprised of several pieces of wand material interconnected to one another, such that the wand can be collapsed for consolidation and storage when not in use.

20 Claims, 6 Drawing Sheets

DETACHABLE CLEARANCE WANDS

This application is a continuation-in-part of application Ser. No. 11/176,114, filed Jul. 6, 2005, status: now pending.

BACKGROUND OF THE INVENTION

1. Field of the Invention

This invention relates generally to automobile accessories and, more specifically, to Detachable Clearance Wands.

2. Description of Related Art

Recreational Vehicles ("RV's") have become increasingly popular means of vacationing for many modern families. As the RV design has evolved, many features previously only available in a brick-and-mortar house have now become standard and optional features in RV's, including hardwood flooring, granite countertops, satellite communications, and many others.

Another aspect of the RV evolution is that they have become larger and larger. Because there is a limitation on width of the RV (i.e. so that they can still be driven over the road) the conventional RV could only be enlarged by making it longer and longer. One fairly recent advancement was that of the "slide-out." FIG. 1A depicts an RV having a conventional slide-out.

FIG. 1A is a perspective view of a conventional RV 10 having its slide-out compartment 18 retracted; FIG. 1B is a perspective view of that conventional RV 10 with the slide-out compartment 18 extended. The RV 10 has one or more panels 14 dispersed on the sidewall 12 of the RV 10. Once the RV 10 has been parked in its camping location, the slide-out compartment 18 is extended outwardly for an extension length 20. The effect of adding a slide-out compartment 18 to a conventional RV was to add additional interior width without exceeding the over-the-road width of the RV 10. The slide-out feature has become so popular that RV's are now being offered with as many as four individual slide-out compartments 18 incorporated into them.

The problem with the slide-out compartment 18 is that they tend to make positioning the RV 10 quite a bit more difficult in many campgrounds. The problem relates to obstructions on the sides of the campground space. It is common for there to be one or more utility hookup posts 16 between each of the spaces. At these posts 16, the RV can connect to the various utilities provided by the campground to their tenants, such as electrical power, water, cable television, etc. The specific problem is that it is difficult for the RV driver to really know how far the slide-out compartment 18 will extend (i.e. the extension length 20). What happens is that the driver parks the RV 10 where he or she believes there will be sufficient spacing; then they test extend the slide-out compartment 18 to see whether or not it strikes the post 16 when fully extended. If it looks like there is insufficient space, the driver must reenter the RV 10, retract the slide-out 18, reposition the RV 10, and then re-extend the slide-out 18. This can be a very cumbersome process, particularly where there are numerous obstructions and more than one slide-out.

What is needed is a device and method that permits the RV driver to park the RV 10 once, and not be in fear of the slide-out compartment 18 impinging upon external obstructions.

SUMMARY OF THE INVENTION

In light of the aforementioned problems associated with the prior devices and methods, it is an object of the present invention to provide Detachable Clearance Wands and a method for their use. The wands should provide a driver of a vehicle equipped with slideout compartments with a clear dimension for the extension length of the slideout. The wands should be attachable to a side of the vehicle prior to parking it to provide the extension length without risk of damage to the slideout. The wands should be length-adjustable so that they can be configured for any length slideout. In an alternate embodiment, the wands should be comprised of several pieces of wand material interconnected to one another, such that the wand can be collapsed for consolidation and storage when not in use.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide Detachable Clearance Wands.

Figure 2:
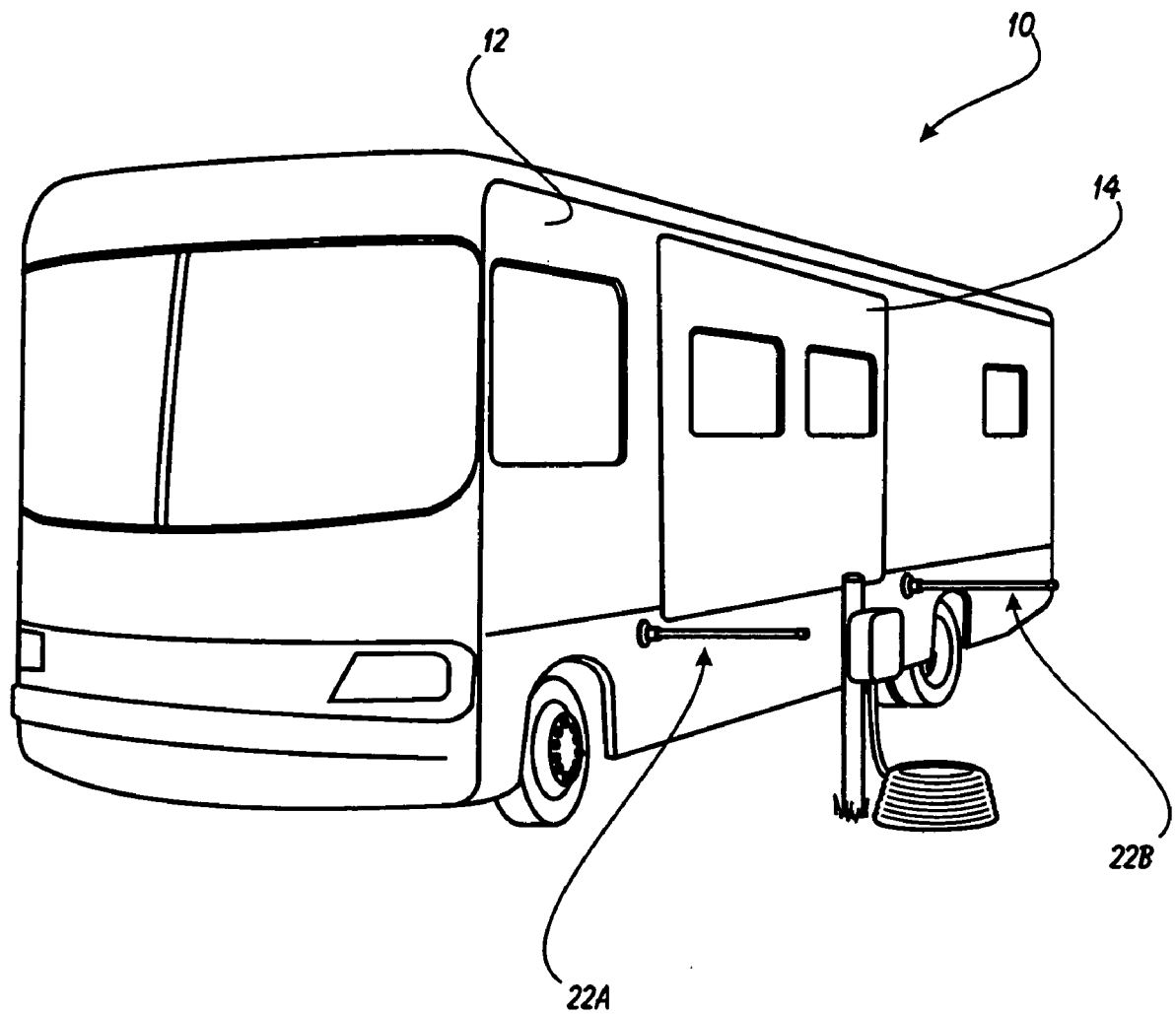
FIG. 2 is a perspective view of a conventional RV having a pair of clearance wands of the present invention attached to it.

The present invention can best be understood by initial consideration of FIG. 2. FIG. 2 is a perspective view of a conventional RV 10 having a pair of clearance wands 22A and 22B of the present invention attached to it. The clearance wands (generically referred to as 22) are attached to the sidewall 12 of the RV 10 in the vicinity of the slide-out panel 14. The purpose of the wand 22 is to provide the RV driver with an indicator, visible in the rear view mirrors of the RV, as to how much space must be left between the RV 10 sidewall 12 and any obstructions around the campsite.

Here, the first clearance wand 22A is attached to the sidewall 12 just ahead of the slideout panel 14, and the second clearance wand 22B is attached to the sidewall 12 just behind of the slideout panel 14. The driver may prefer to position the wands 22 at the corners of the RV 10, depending upon where and how many slideout compartments there are.

Because the driver need only avoid striking anything with the wands 22 when parking, the use of the wands 22 during the parking process will ensure that the slideout compartment will not be too close to obstructions to be extended; furthermore, the driver will be able to have perfect positioning without the need to dismount, then mount, then dismount again. If we now turn to FIGS. 3A and 3B, we can examine the structural features of this embodiment of the present invention.

Figure 3A:
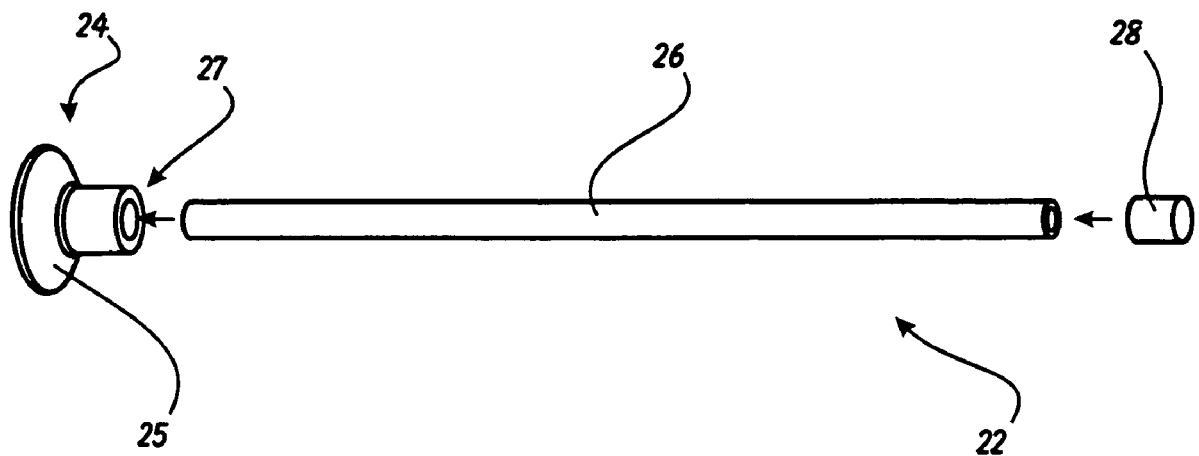
FIGS. 3A and 3B are perspective views of the clearance wand of FIG. 2.
Figure 3B:
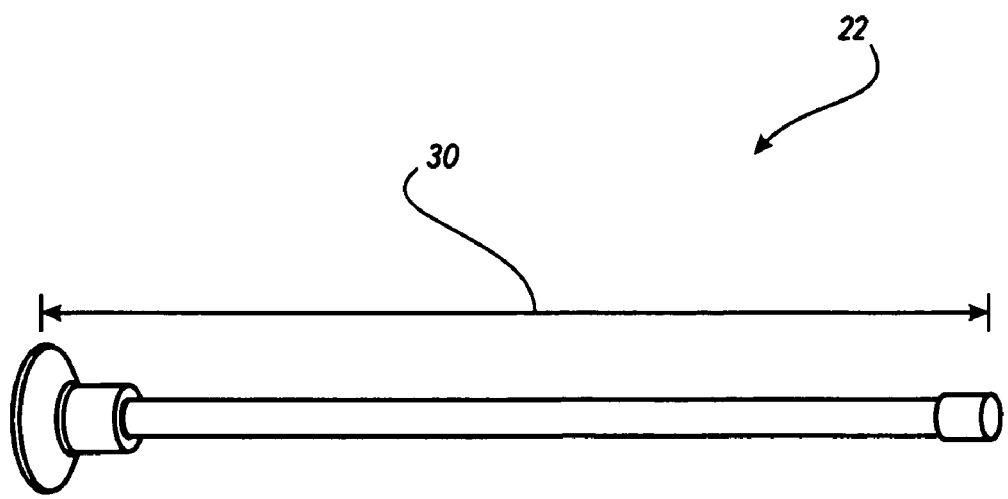

FIGS. 3A and 3B are perspective views of the clearance wand 22 of FIG. 2. In this version, the wand 22 comprises a suction cup base 24, defined by a suction cup 25 for temporary attachment to the fiberglass wall of the RV, and a socket 27 extending opposite therefrom.

A wand member 26 is insertable into the socket 27 so that it is securely held therein. The wand member 26 is preferably made from a lightweight, yet fairly rigid material, such as thin-walled PVC or other material having like properties. The wand member 26 needs to be rigid enough so that it can be up to approximately forty-eight inches long (extending horizontally) without buckling, bending or sagging unacceptably.

Figure 1A:
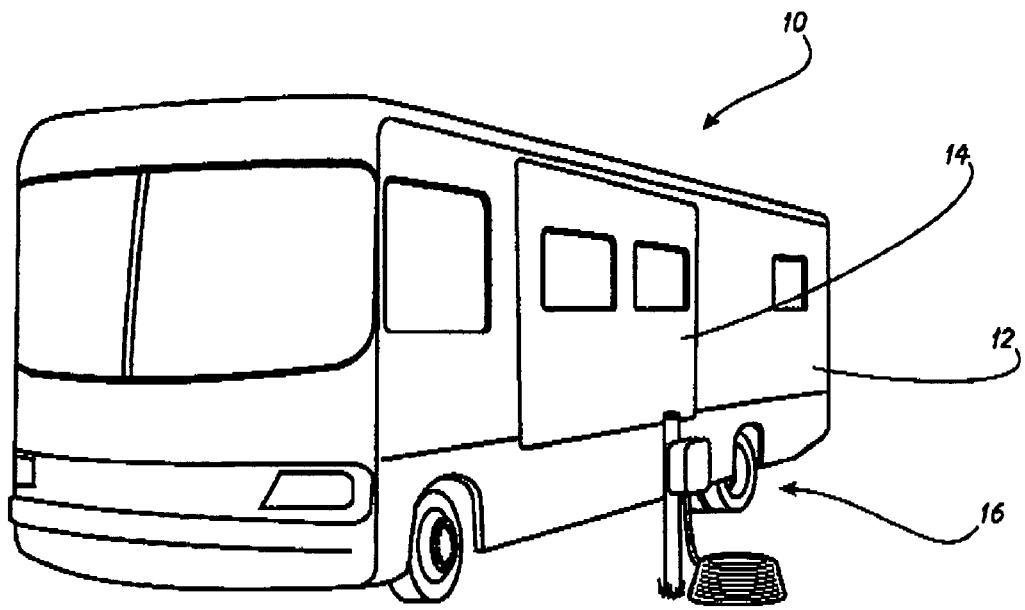
FIGS. 1A and 1B are perspective views of a conventional RV having a slide-out compartment.
Figure 1B:
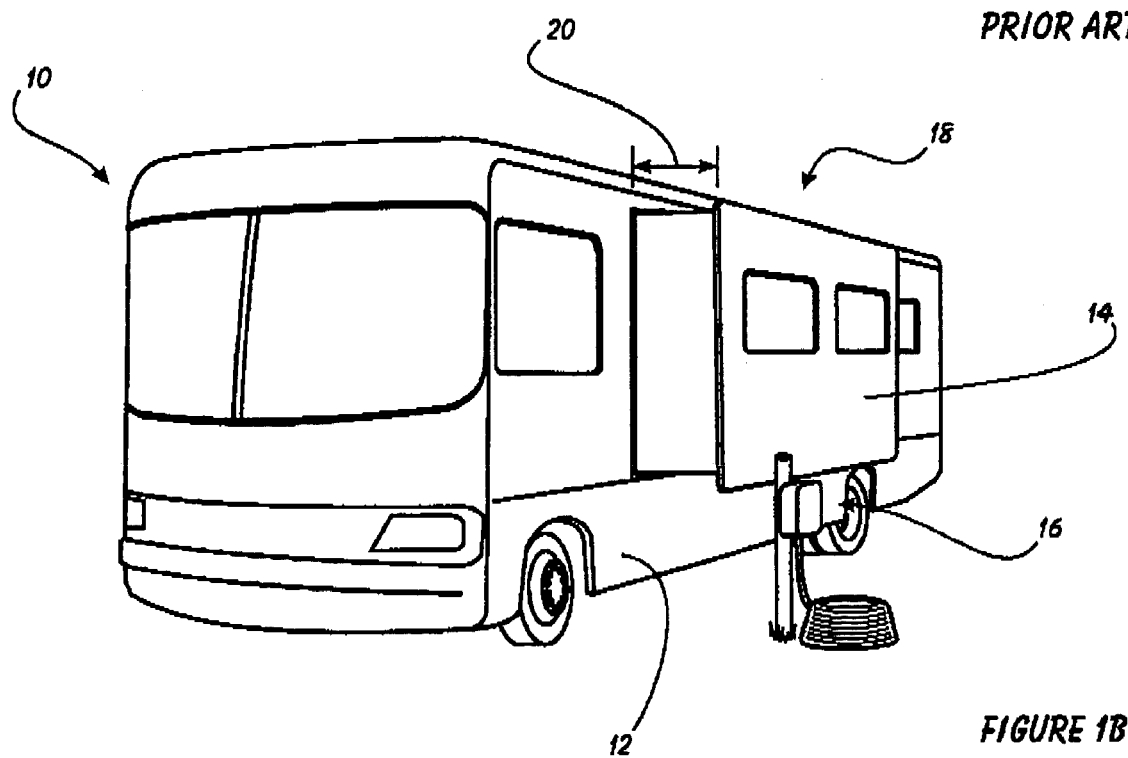

In order that the tip of the wand 22 is easily visible to the RV driver, there will be a brightly-colored cap 28 attached to the distal end of the wand member 26. The cap 28 may also be tape applied to the end of the wand member 26. The cap 28 or tape is removable so that the length of the wand member 26 can be tried down until the clearance length 30 (the overall length of the suction cup base 24, wand member 26 and cap 28 fully assembled) is equal to or greater than the extension length of the slideout compartment (see FIG. 1B). If we now turn to FIG. 4, we can examine the best way for customizing the wands for a particular vehicle configuration.

Figure 4:
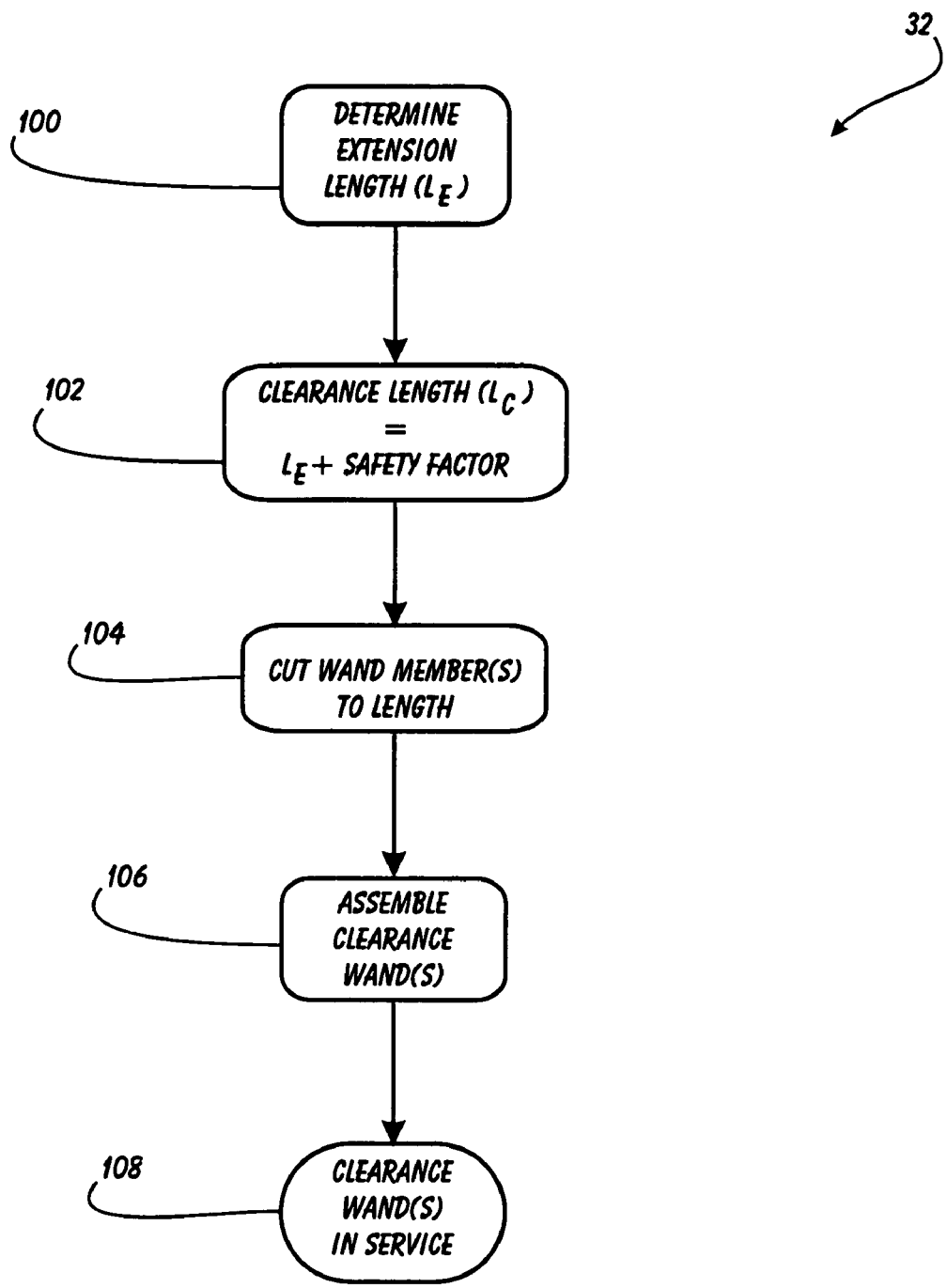
FIG. 4 is a flowchart depicting the method for adjusting the clearance wand of FIGS. 2 and 3A/3B.

FIG. 4 is a flowchart depicting the method 32 for adjusting the clearance wand of FIGS. 2 and 3A/3B. First, the extension length of the slideout compartment must be determined ($L_E$) 100. Next, the clearance length ($L_C$) is determined 102 by adding a Safety Factor to the extension length ($L_E$). The wand member(s) are then cut to length 104 such that the clearance wand(s) are equal to the ($L_C$). The clearance wand(s) are then assembled 106, and the wand(s) are then ready for service 108. This method must be repeated only once for each clearance wand; it is only necessary that the individual clearance wands be used in the same location on the RV every time that the RV is parked (or at least for the same slideout). Now turning to FIG. 5 so that we can examine the method for use of the length-adjusted wand(s).

Figure 5:
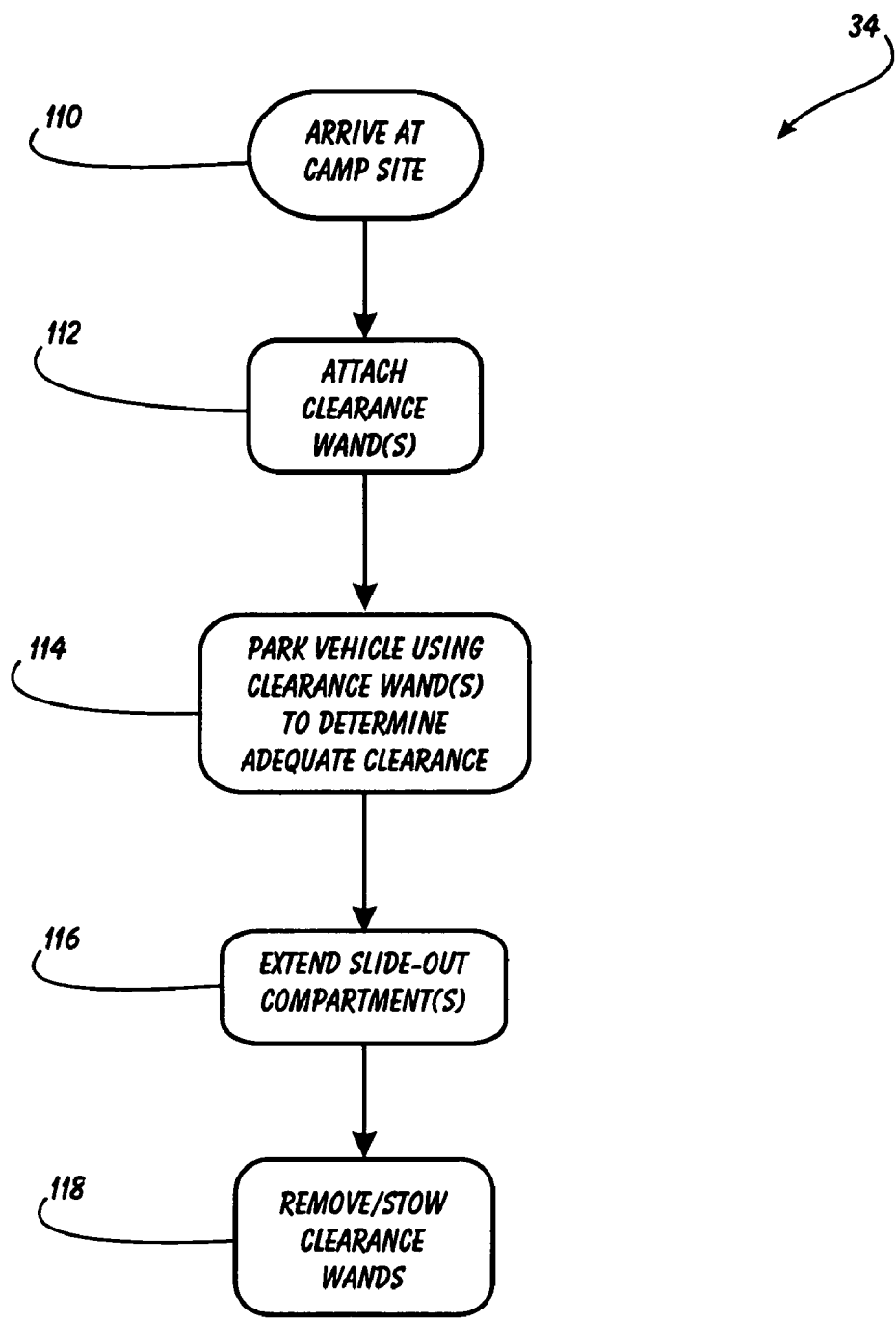
FIG. 5 is a flowchart depicting the method for use of the clearance wands of FIGS. 2 and 3A/3B.

FIG. 5 is a flowchart depicting the method for use of the clearance wands of FIGS. 2 and 3A/3B. After arriving at the camp site 110, the driver need only dismount briefly to attach the clearance wands 112 to the sidewall of the RV. This can usually be done upon initial arrival at the entrance to the campground, since the driver will many time dismount in order to check in with the rental office.

The driver then parks the RV using the clearance wands to ensure that there is adequate clearance on the side(s) for the slideout(s) 114. At this point, the slideout(s) are safely in the retracted or stowed position. The driver can then safely extend the slideout compartments 116 safely and without fear of striking any exterior obstruction. Once all slideouts are extended, the clearance wands can be removed and stowed 118 for future use. Finally turning to FIGS. 6A and 6B, we can see another preferred embodiment of the present invention.

Figure 6A:
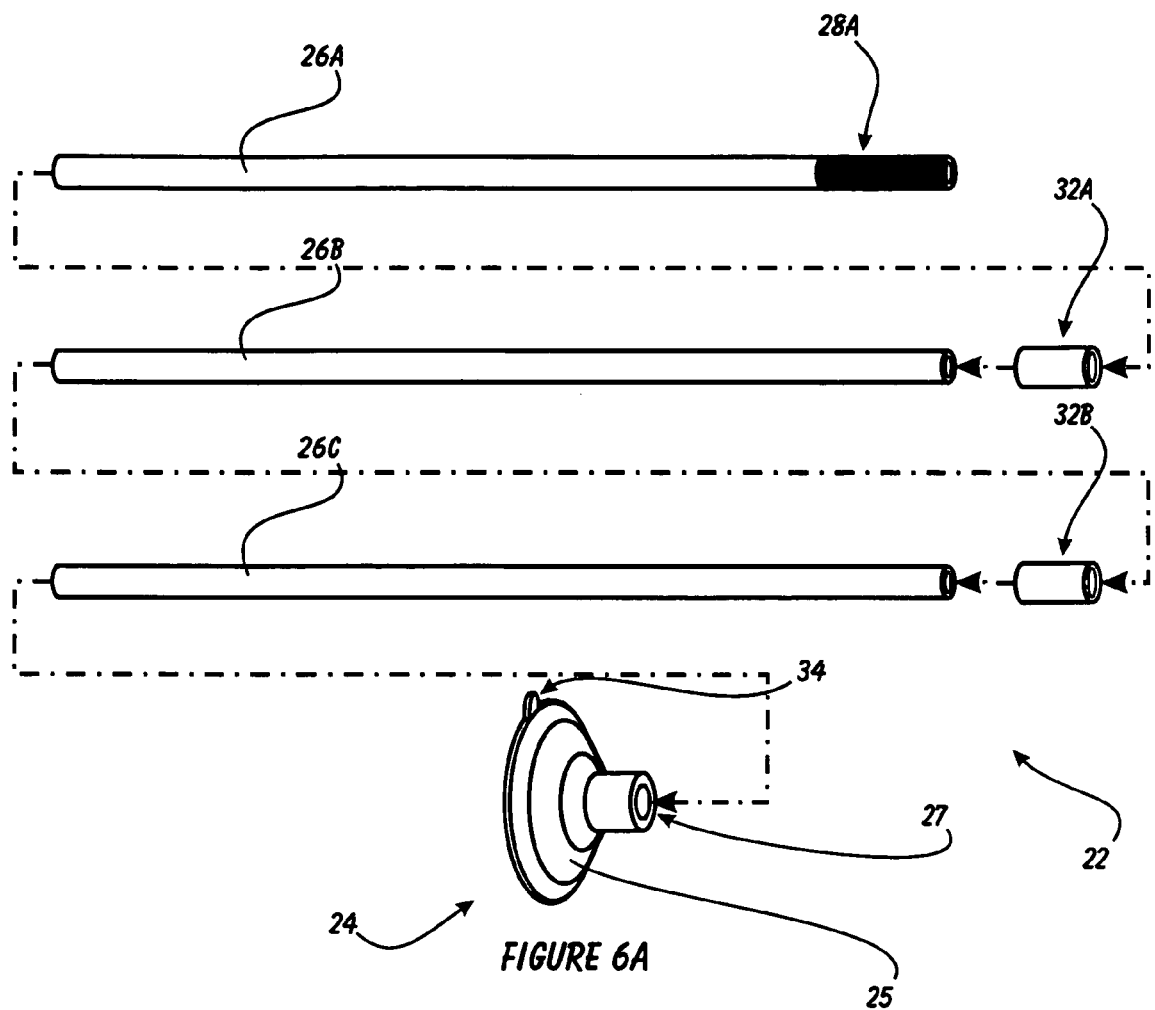
FIGS. 6A and 6B are perspective views of an embodiment of a collapsible clearance wand of the present invention.
Figure 6B:
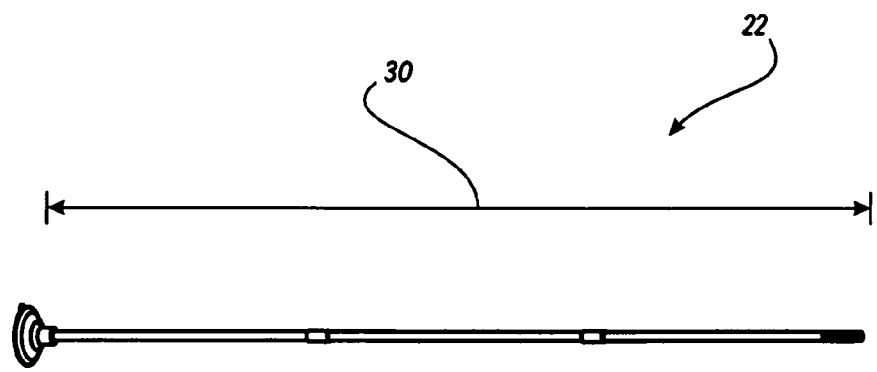

FIGS. 6A and 6B are perspective views of an embodiment of a collapsible clearance wand 22. The wand 22 is actually comprised of several wand elements 26A-26C that can be assembled together in order to form a completed wand member 26. In this version, there are one, two or more connecting elements (e.g. 32A, 32B) that are unions between a pair of adjoining wand elements 26A-26C. The inner diameter of the connecting elements 32A, 32B are slightly larger than the outer diameter of the wand elements 26A-26C so that an end of a wand element (e.g. 26A) will fit into each end of the connecting elements (e.g. 32A).

In order to prevent the loss of any of the connecting elements 32A, 32B, one end may be pre-assembled and bonded to one end of a wand element 26A-26C. In another non-depicted version, the connecting elements 32A, 32B are actually integrated into the wand elements 26A-26C, whereby the wand elements have an enlarged end that is configured to receive the end of an adjacent wand element within it.

Also depicted here is an alternate embodiment of the suction cup 25. In this version, the suction cup base 24 is larger in size to prevent a secure attachment to the side of the vehicle, and further, a releasing tab 34 is provided to ease removal of the wand 22 from the vehicle. The releasing tab 34 extends outwardly adjacent to the outer edge of the suction cup base 24 in such a way so that it is easily grasped and pulled. Pulling on the releasing tab 34 will cause that section of the suction cup base 24 to be pulled away from the vehicle's side, thereby breaking the suction between the base 24 and the vehicle.

The cap 28 of the original embodiment has been integrated into a colored section 28A at one end of one of the wand elements 26A. This colored section 28A may be created by a permanently attached cap, by colored tape, by paint, or some other coating at the end of the element 26A. In any event, the length of the colored portion will be longer than is the cap 28 to account for a portion of it being cut off during the sizing process previously-described. Alternatively, the user could cut back one of the other wand elements 26B, 26C in order to shorten the length of the clearance wand 22—this way none of the colored portion would be discarded. In the version depicted here, furthermore, element 26A is made from a thinner-walled material than are the other elements 26B, 26C to make the cutting process simpler. Elements 26B and 26C have a thicker wall to provide greater rigidity over the length of the assembled wand 22.

When fully assembled, the wand 22 will be as depicted in FIG. 6B. The diameter of the wand elements 26A-26C is in scale with the length of the wand 22 and wand elements 26A-26C (as compared with the demonstration view depicted above in FIGS. 3A and 3B which are provided as such to aid in the basic understanding of the invention).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A detachable clearance wand for attaching to the sidewall of a recreational vehicle, comprising:
   a base;
   an elongate wand member attachable to said base, said elongate wand member comprising two or more wand elements, with a pair of adjacent wand elements detachably attached to one another in end-to-end orientation whereby said wand elements remain in relative axial alignment; and
   a cap located at a distal end of said wand member.

2. The wand of claim 1, wherein a pair of said adjacent wand elements are interconnected by a connecting element.

3. The wand of claim 2, wherein said elongate wand member comprises three said wand elements and two said connecting elements.

4. The wand of claim 3, wherein said cap is a colored portion applied at a distal end of one said wand element.

5. The wand of claim 4, wherein said base comprises a suction cup defining a cup face and a top side opposing said cup face.

6. The wand of claim 5, wherein said suction cup further comprises a releasing tab extending outwardly therefrom.

7. The wand of claim 6, wherein said base further comprises a socket formed on said top side, said socket configured to accept a base end of said wand member therein.

8. The wand of claim 7, wherein said wand member comprises an elongate tubular assembly of said wand elements defining said base end and a cap end opposite thereto.

9. A method for safely parking a recreational vehicle, said recreational vehicle defined by a sidewall having a slideout panel dispersed thereon, said slideout panel comprising an outer wall of a slideout compartment, the method comprising:

retracting said slideout compartment;

assembling a clearance wand by interconnecting two or more elongate wand elements in end-to-end orientation, attaching a base to one end of said interconnected wand elements;

attaching said clearance wand to said sidewall, said wand defining a clearance length;

parking said recreational vehicle while leaving clearance between external obstructions and said sidewall equal to or greater than said clearance length; and extending said slideout compartment.

10. The method of claim 9, wherein said clearance wand of said assembling and attaching steps comprises a suction cup defining a cup face and a top side opposing said cup face.

11. The method of claim 10, wherein said clearance wand of said attaching step further comprises a socket formed on said top side, said socket configured to accept a base end of said wand member therein.

12. The method of claim 11, wherein said wand member of said clearance wand of said attaching step comprises an elongate tubular assembly of said wand elements defining said base end and a cap end opposite thereto.

13. The method of claim 12, wherein said wand member of said clearance wand of said attaching step is at least 30 inches in length.

14. A detachable clearance wand for attaching to the sidewall of a recreational vehicle, comprising:

a base;

an elongate wand member attachable to said base, said elongate wand member comprising two or more wand elements, with a pair of adjacent wand elements detachably attached to one another in end-to-end orientation by a connecting element, said connecting element comprising a pair of opposing sockets, each said socket configured to accept one said wand element end therein whereby said elongate wand member is formed in axial alignment; and a cap defined at a distal end of said wand member.

15. The wand of claim 14, wherein said elongate wand member is at least 30 inches in length.

16. The wand of claim 15, wherein said base comprises a suction cup defining a cup face and a top side opposing said cup face.

17. The wand of claim 16, wherein said base further comprises a releasing tab extending outwardly from said suction cup.

18. The wand of claim 17, wherein said base further comprises a socket formed on said top side, said socket configured to accept a base end of said wand member therein.

19. The wand of claim 18 wherein said wand member comprises an elongate tubular member defining said base end and a cap end opposite thereto.

20. The method of claim 9, further comprising a length-adjusting step prior to said attaching step wherein said wand clearance length is adjusted such that it meets or exceeds the distance that said slideout compartment extends.

* * * * *